US007630691B2

(12) United States Patent
Chen et al.

(10) Patent No.: US 7,630,691 B2
(45) Date of Patent: Dec. 8, 2009

(54) SELECTIVE COMBINING OF MULTIPLE NON-SYNCHRONOUS TRANSMISSIONS IN A WIRELESS COMMUNICATION SYSTEM

(75) Inventors: Tao Chen, San Diego, CA (US); Serge Willenegger, Onnens (CH); Edward G. Tiedemann, Jr., Concord, MA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 10/056,278

(22) Filed: Jan. 23, 2002

(65) Prior Publication Data

US 2003/0139140 A1    Jul. 24, 2003

(51) Int. Cl.
*H04B 17/00* (2006.01)
*H04W 24/00* (2009.01)

(52) U.S. Cl. .................. 455/67.11; 455/67.13; 455/423

(58) Field of Classification Search ................ 455/67.1, 455/423, 501, 67.11, 67.13; 370/336, 474, 370/328; 714/748, 750
See application file for complete search history.

(56) References Cited

U.S. PATENT DOCUMENTS

| | | | | |
|---|---|---|---|---|
| 5,446,759 | A * | 8/1995 | Campana, Jr. | ................ 375/267 |
| 5,663,990 | A | 9/1997 | Bolgiano et al. | |
| 5,920,553 | A | 7/1999 | Keskitalo et al. | |
| 6,286,122 | B1 * | 9/2001 | Alanara | ....................... 714/781 |
| 6,335,933 | B1 * | 1/2002 | Mallory | ....................... 370/394 |
| 6,763,244 | B2 | 7/2004 | Chen | |

OTHER PUBLICATIONS

Casaccia et al., "Method and Apparatus for Radio Link Control of Signaling Messages and Short Message Data Services in a Communication System," U.S. Publication No. 2003/0156599, Aug. 21, 2003.
Zhao, et al. "A Hybrid ARQ Scheme for DS-CDMA Mobile Data Communications," International Conference On Universal Personal Communications, IEEE, New York, NY, US, vol. 1, Oct. 2, 1996, pp. 71-75.
International Search Report-PCT/US03/001542, International Search Authority - European Patent Office-May 20, 2003.
International Preliminary Examination Report PCT/US03/001542 IPEA/US Aug. 30, 2004.

* cited by examiner

*Primary Examiner*—Eugene Yun
(74) *Attorney, Agent, or Firm*—Kenneth V. Vu; James K. O'Hare (57) ABSTRACT

Techniques for selectively combining multiple transmissions to recover a message comprised of multiple frames. Initially, each transmission is separately processed to recover the message. If the message cannot be recovered error-free from any single transmission, then portions of multiple transmissions are selectively combined to recover the message. Erased frames in a message recovered from a primary transmission (e.g., the one with the best pilot $E_c/I_0$) and good frames from other transmissions are determined (e.g., based on the frame-level CRC). One or more combined messages are then formed, each including a different set of good frames substituting for the erased frames. If a good frame cannot be derived from any single transmission for a given erased frame, then symbols from multiple transmissions may be combined to derive the good frame. Each combined message is checked (e.g., based on the message-level CRC) to determine whether it is good or erased.

26 Claims, 7 Drawing Sheets

SELECTIVE COMBINING OF MULTIPLE NON-SYNCHRONOUS TRANSMISSIONS IN A WIRELESS COMMUNICATION SYSTEM

BACKGROUND

1. Field

The present invention relates generally to data communication, and more specifically to techniques for selectively combining multiple non-synchronous transmissions from multiple signal sources (e.g., base stations) in a wireless (e.g., CDMA) communication system.

2. Background

Wireless communication systems are widely deployed to provide various types of communication such as voice and packet data services for a number of users. These systems may be based on code division multiple access (CDMA), time division multiple access (TDMA), frequency division multiple access (FDMA), or some other multiple access techniques. CDMA systems may provide certain advantages over other types of system, including increased system capacity. A CDMA system is typically designed to conform to one or more standards, such as IS-95, cdma2000, and W-CDMA standards, which are known in the art and incorporated herein by reference.

A CDMA system may be operated to support voice and data communication. During a communication session (e.g., a voice call), a terminal may be in active communication with one or more base stations that ate placed in an "active set" of the terminal. While in soft handoff (or softer handover), the terminal concurrently communicates with multiple base stations, which can provide diversity against deleterious path effects such as fading and multipath. While in active communication or idle, the terminal may also receive signals from the base stations in the active set and/or other base stations for other types of transmission such as, for example, pilots, pages, broadcast messages, and so on.

For some CDMA systems (e.g., a W-CDMA system), the base stations are not required to be operated synchronously. When operated asynchronously, from a terminal's perspective, the timing of the base stations is not aligned, and the reference time for each base station is different from that of other base stations. In this case, similarly formatted messages transmitted from multiple asynchronous base stations are likely to be received at different times at the terminal. Moreover, even if the base stations are operated synchronously, similarly formatted messages may be transmitted to the terminal from multiple base stations at different times (e.g., due to queuing delay, loadings, and so on). In this case, from the terminal's perspective, the transmissions are only "approximately synchronous" with respect to these messages.

If the terminal receives similarly formatted messages from multiple "non-synchronous" base stations, which include asynchronous and approximately synchronous base stations, then these messages need to be processed in the proper manner to correctly recover the underlying message. Since the similarly formatted messages are received at different times at the terminal, these messages cannot be combined at the symbol level in a straightforward manner, like the symbols for multiple signal instances (or multipaths), prior to the decoding to recover the message. If the underlying message cannot be recovered error-free from any single received transmission, then it may be necessary to combine multiple received transmissions in such a manner that the message can be recovered error-free.

There is therefore a need in the art for techniques to selectively combine multiple non-synchronous transmissions from multiple signal sources to correctly recover transmitted messages.

SUMMARY

Techniques are provided herein for selectively combining multiple non-synchronous transmissions targeted to a given receiver unit (e.g., a terminal) to recover transmitted messages error-free. The ability to selectively and properly combine multiple non-synchronous transmissions may allow for improved receiver performance (e.g., lower frame error rate (FER)), lower transmission power levels (and thus lower interference to other users in a CDMA communication system), and possibly other benefits.

In a specific embodiment, a method is provided for selectively combining a number of non-synchronous transmissions at a receiver unit to recover a desired message comprised of a number of frames. These transmissions may be forward link transmissions from a number of base stations in a CDMA communication system. The desired message may be a page message, a broadcast message, or some other type of message. The desired message is previously coded with a forward error detection (FED) code, such as a cyclic redundancy check (CRC) code, at both the frame level and the message level and sent on the forward link transmissions from multiple signal sources (i.e., transmitter units) to the receiver unit.

Initially, each of the transmissions is separately processed to recover the message transmitted on that transmission. If the desired message cannot be recovered error-free from a single transmission, then portions of multiple transmissions may be selectively combined to recover the message. One of the transmissions may be selected as the primary transmission (e.g., the one with the best signal quality, e.g., as estimated by the pilot energy-per-chip-to-total-noise ratio $(E_c/I_0)$, or the one with the least number of erased frames). The erased frames in the message recovered from this primary transmission are then determined (e.g., based on a set of CRC bits included with each frame), and the good frames from the other transmissions are also determined.

One or more combined messages may then be formed, with each combined message including a different set of good frames substituting for the erased frames. If frame-level timing is known, then one combined message may be formed by substituting each erased frame in the message recovered from the primary transmission with a corresponding good frame from one of the other transmissions. And if frame-level timing is not known, then various combinations of good frames may be tried for the erased frames. Each combined message is checked (e.g., based on the CRC bits included with the message) to determine whether it is good or erased.

If a good frame cannot be derived from a single transmission for an erased frame, then symbols for two or more transmissions corresponding to the erased frame may be combined and decoded to derive the good frame for the erased frame. The transmissions may be ranked (e.g., based on the pilot $E_c/I_0$), and the symbols from these transmissions and corresponding to the erased frame may be combined in a particular order determined based on the ranking of the transmissions. For example, the symbols from the two highest ranking transmissions may be combined first and decoded, then the symbol from the third highest ranking transmission may be combined next if a good frame cannot be derived from the first two transmissions, and so on. The symbols from multiple transmissions may also be weighted (e.g., based on the pilot $E_c/I_0$) prior to being combined.

Various aspects and embodiments of the invention are described in further detail below. The invention further provides methods, receiver units, terminals, systems, program products, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
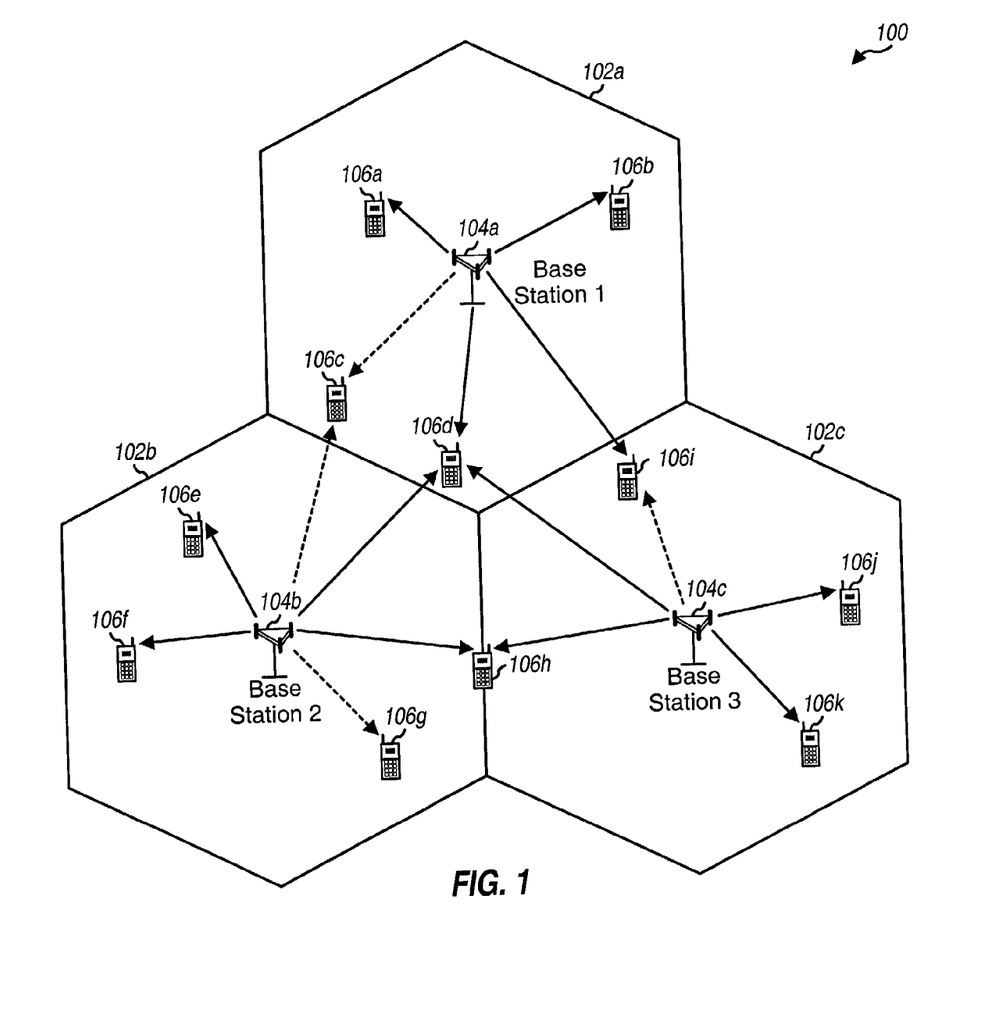
FIG. 1 is a diagram of a wireless multiple-access communication system that supports a number of users.

FIG. 1 is a diagram of a wireless multiple-access communication system 100 that supports a number of users. System 100 includes a number of base stations 104 that provide coverage for a number of geographic regions 102. A base station may also be referred to as a base transceiver system (BTS), an access point, a UTRAN, or some other terminology. The base station and/or its coverage area are also often referred to as a cell. System 100 may be designed to implement one or more CDMA standards, such as IS-95, W-CDMA, cdma2000, IS-856, and other standards.

As shown in FIG. 1, various terminals 106 are dispersed throughout the system. In an embodiment, each terminal 106 may communicate with one or more base stations 104 on the forward link and/or reverse link at any given moment, depending on whether or not the terminal is active and whether or not it is in an area with adequate forward link signal quality from more than one base stations 104. The forward link (i.e., downlink) refers to transmission from the base station to the terminal, and the reverse link (i.e., uplink) refers to transmission from the terminal to the base station.

As shown in FIG. 1, base station 104a transmits user-specific traffic data to terminals 106a, 106b, 106d, and 106i on the forward link, base station 104b transmits user-specific traffic data to terminals 106d, 106e, 106f, and 106h, and base station 104c transmits user-specific traffic data to terminals 106d, 106h, 106j, and 106k. These user-specific transmissions are indicated by the solid lines between the base stations and the terminals. Other terminals in the system may receive pilots and common/dedicated signaling, but no user-specific traffic data transmissions, from the base stations, as shown by the dashed lines between the base stations and these terminals. Terminals 106d and 106h are in overlapping coverage from more than one base stations, and each of these terminals concurrently receives data transmissions from multiple base stations. The reverse link communication is not shown in FIG. 1 for simplicity.

Each terminal that has registered with the system and is in active communication may be associated with an "active set" that includes a list of one or more active base stations with which the terminal communicates. The active set is typically "valid" and used when a terminal is in active communication and assigned a traffic channel. In an embodiment, each terminal that has registered with the system but is not in active communication may be associated with an "virtual active set" that includes a list of one or more "virtually active" base stations with which the terminal may communicate. One base station in the virtual active set is typically designated as the reference base station, and various system parameters (e.g., timing) are referenced with respect to this base station. For example, the terminal may designate the base station with the strongest received signal as the reference base station, or the system may indicate which is the reference base station in a common or dedicated control message. The active and virtually active base station(s) can concurrently transmit user-specific traffic data and/or dedicated messages (e.g., pages) to the terminal to increase the reliability of the transmission.

The techniques described herein to selectively combine multiple transmissions may be used for various types of transmissions, including user-specific traffic data, common messages, dedicated messages, and so on. A common message is one that may be received by all terminals in the system, such as a broadcast message. A dedicated message is one that is targeted to a specific terminal, such as a page message or a user-specific control message. For clarity, some aspects and embodiments of the invention are described below for the selective combining of page messages, which are commonly transmitted in wireless communication systems such as CDMA systems.

Figure 2:
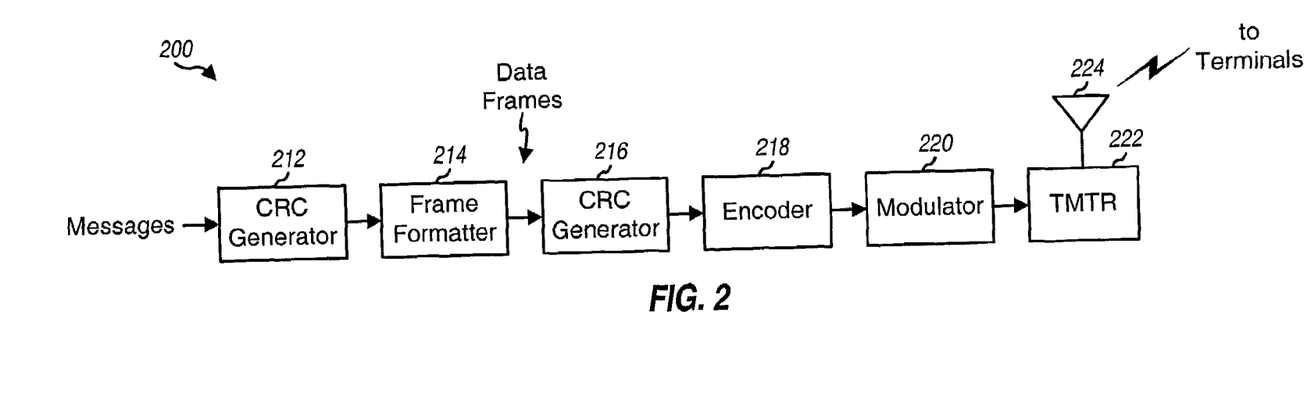
FIG. 2 is a block diagram of an embodiment of a transmitter unit for a base station.

FIG. 2 is a block diagram of an embodiment of a transmitter unit 200 for a base station 104. System 100 supports various types of data transmissions such as traffic data (e.g., voice and packet data), signaling (e.g., page, broadcast, and control messages), and so on. The data to be transmitted is initially processed at a higher signaling layer (e.g., the MAC Layer) and then further processed by a lower signaling layer (e.g., the Physical Layer) to generate a modulated signal suitable for transmission over the wireless link.

On the forward link, at transmitter unit 200, common and/or dedicated messages are provided, one message at a time, from a message source to a cyclic redundancy check (CRC) generator 212. For each message, CRC generator 212 generates a set of CRC bits (i.e., a CRC value) based on the content of the message and a particular polynomial. These CRC bits may be used at the receiver to determine whether or not the message was received correctly. The CRC bits are attached to the message, and the CRC-coded message is provided to a frame formatter 214.

Frame formatter 214 segments each CRC-coded message into one or more frames. Each frame is typically transmitted over a fixed time interval (e.g., 5, 10, or 20 msec), and the size of each frame is dependent on the data rate to be used for the message. For an example of page messages, the frames can be transmitted at 4.8 Kbps or 9.6 Kbps (for a cdma2000 system) and each 20 msec frame includes 96 or 192 bits, respectively. Frame formatter 214 may further format each frame into a particular format defined by the system. The formatted frames are then provided to a CRC generator 216, which generates a set of CRC bits for each frame based on the content of the frame and another polynomial. These CRC bits may be used at the receiver to determine whether or not the frame was received correctly. The CRC bits for each frame are attached to the frame, and the CRC-coded frame is provided to an encoder 218.

Encoder 218 codes each CRC-coded frame in accordance with a particular coding scheme to provided coded data. The coding scheme may include convolutional coding, Turbo coding, block coding, other coding, or any combinations thereof, or no coding at all. Typically, traffic data and messages may be coded using different schemes, and different types of message may also be coded differently. The coded data for each frame is typically interleaved to provide time diversity against deleterious path effects.

The coded and interleaved data is provided to a modulator 220 and further processed to generate modulated data. The processing by modulator 220 may include (1) mapping the coded bits to symbols based on a particular modulation scheme (e.g., BPSK, QPSK, M-PSK, or M-QAM), (2) repeating or puncturing (i.e., deleting) zero or more symbols to obtain the desired data rate, (3) covering the symbols with orthogonal or pseudo-orthogonal codes (e.g., Walsh codes, orthogonal variable spreading factor (OVSF) codes, or quasi-orthogonal functions (QOF)) to channelize the messages into the assigned code channels (e.g., the paging channel), and (4) spreading the covered data with a complex PN sequence assigned to the base station.

The modulated data is then provided to a transmitter (TMTR) 222 and conditioned (e.g., converted to one or more analog signals, up-converted to a radio frequency, amplified, filtered, and quadrature modulated) to generate a forward link modulated signal suitable for transmission over the wireless link. The forward link modulated signal is then transmitted via an antenna 224 to the terminals in the system.

The specific processing to be performed by encoder 218 and modulator 220 is dependent on various factors such as the type of message being processed and the CDMA standard being implemented. Different signal processing from that described above may also be performed and is within the scope of the invention. For example, other forward error detection (FED) codes may be used instead of the CRC code for the error detection at the receiver unit.

Figure 3:
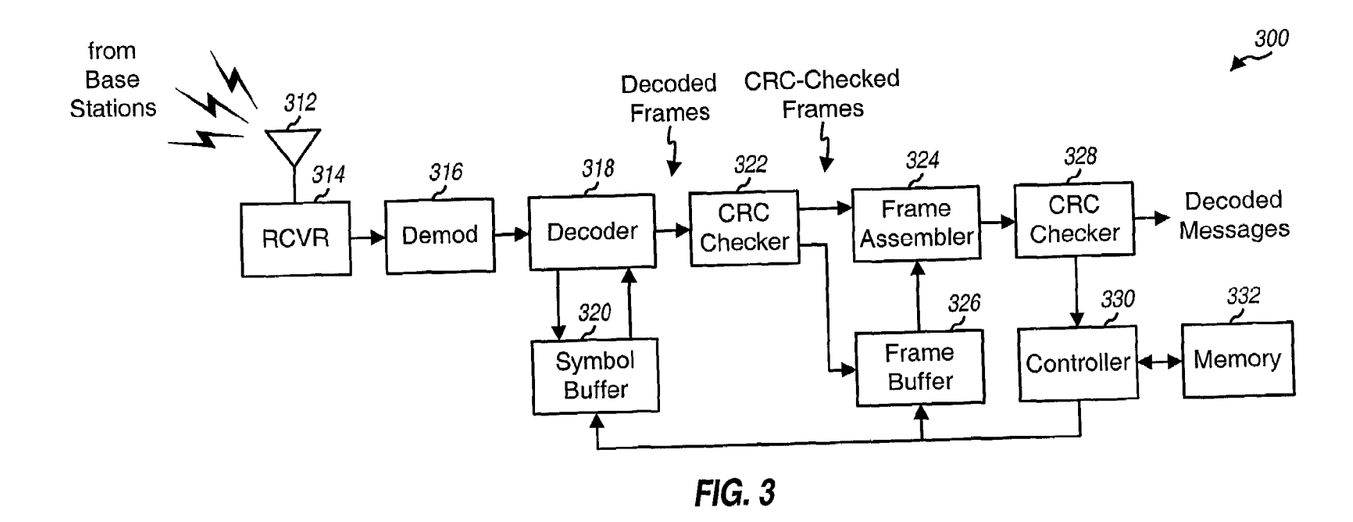
FIG. 3 is a block diagram of an embodiment of a receiver unit for a terminal.

FIG. 3 is a block diagram of an embodiment of a receiver unit 300 for a terminal 106. One or more forward link modulated signals from one or more transmitter units may be received by an antenna 312, and the received signal is provided to a receiver (RCVR) 314. Receiver 314 conditions (e.g., filters, amplifies, and downconverts) the received signal and further digitizes the conditioned signal to provide a stream of samples. A demodulator (Demod) 316 then receives and processes the samples to provide recovered symbols. The processing by demodulator 316 may include (1) despreading the samples with a complex PN sequence aligned to the arrival time of a signal instance being processed, (2) decovering the despread samples to channelize the received traffic data and messages onto their respective code channels, (3) coherently demodulating the decovered data with a recovered pilot to provide demodulated symbols, (4) accumulating the demodulated symbols for repeated symbols and inserting erasures for punctured symbols, and (5) de-mapping the symbols back to multi-bit values (which are estimates of the coded bits) based on a particular demodulation scheme. In general, the processing by demodulator 316 is complementary to the processing by modulator 220.

A forward link modulated signal transmitted from a particular base station may reach the terminal via one or multiple signal paths. These signal paths may include a straight line-of-sight path and/or reflected paths. A reflected path is created when the transmitted signal is reflected off a reflection source and arrives at the terminal via a different path than the line-of-sight path. The reflection sources are typically artifacts in the environment in which the terminal is operating (e.g., buildings, trees, or some other structures). The received signal at the terminal may thus comprise a number of signal instances (or multipaths) from one or more base stations.

Demodulator 316 may be implemented with a rake receiver that can process multiple signal instances in the received signal. The rake receiver includes a number of finger processors (or simply, fingers), and each finger processor may be assigned to process a particular multipath component from a particular base station. The demodulated symbols from all multipaths with assigned finger processors of a particular transmitter unit may be appropriately aligned in time via "deskew" buffers provided for these multipaths, and the time-aligned symbols may be weighted and combined to provide recovered symbols (i.e., the demodulated data) for the transmission from this transmitter unit. If multiple transmissions are received from multiple transmitter units and processed by demodulator 316, then multiple recovered symbol streams are provided for these transmissions, one stream for each received and processed transmission. The recovered symbol streams are then provided to a decoder 318.

Decoder 318 receives each recovered symbol stream and performs the signal processing complementary to that performed by encoder 218 at the transmitter unit. The processing by decoder 318 for each recovered symbol stream may include (1) deinterleaving the symbols for each frame in accordance with a deinterleaving scheme complementary to the interleaving scheme used at the transmitter unit, and (2) decoding the deinterleaved symbols for each frame in accordance with a decoding scheme complementary to the coding scheme used at the transmitter unit. For example, a Viterbi decoder or a Turbo decoder may be used if convolutional or Turbo coding, respectively, is performed at the transmitter unit. The deinterleaved symbols, which are estimates of the coded bits at the transmitter unit, for certain frames may also be provided to a symbol buffer 320 and stored for later use, as described below. Each decoded frame is provided to a CRC checker 322.

CRC checker 322 checks each decoded frame based on the CRC bits included with the frame to determine whether the frame was received correctly (i.e., good) or in error (i.e., erased). CRC checker 322 then provides the CRC-checked frame to a frame assembler 324 and/or a frame buffer 326. CRC checker 322 further provides to a controller 330 the status of each CRC-checked frame, which indicates whether the frame is good or erased.

Frame assembler 324 assembles one or more frames for each message being recovered and provides the message to a CRC checker 328. CRC checker 328 then checks each message based on the CRC bits included with the message to determine whether the message was received correctly or in error. CRC checker 328 then provides the CRC-checked message, which represents the decoded message. CRC checker 328 further provides to controller 330 the status of each CRC-checked message, which indicates whether the message is good or erased.

Controller 330 directs various operations at receiver unit 300, and memory 332 may be used to store data and codes for controller 330. Controller 330 receives the frame statuses from CRC checker 322 and the message statuses from CRC checker 328. Depending on the frame and message statuses and/or the particular operating mode of the receiver unit, controller 330 may direct symbols and/or frames to be selectively combined such that the transmitted messages may be recovered error-free at the receiver unit. Various schemes for selectively combining frames and/or symbols to recover transmitted messages are described below.

For some CDMA systems (e.g., a W-CDMA system), the base stations in the system may be operated such that they are all synchronized to each other, or they may be operated such that they are asynchronous to each other. This choice of synchronous or asynchronous operation may be dependent on the manner in which a particular system is operated by the network operator. A CDMA system may also be operated such that some of the base stations are synchronized while other base stations are not synchronized. Some possible configurations for the base stations in the system are described below.

Figure 4A:
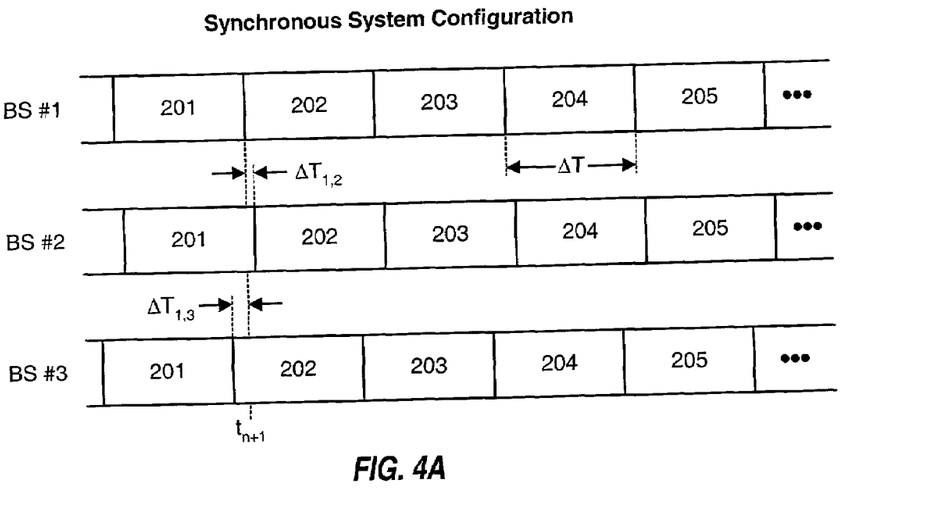
FIGS. 4A and 4B are diagrams illustrating two system configurations in which three base stations are operated synchronously and asynchronously, respectively.

FIG. 4A is a diagram illustrating a system configuration in which a number of base stations (e.g., three in this example) are operated synchronously but with non-aligned frame start. For this configuration, the frames on the overhead channels for the three base stations do not start at the same time but are instead offset from one another by some (constant) values. The overhead channels are channels used to transmit signaling or other types of information to the terminals, and typically include the paging channel, the broadcast channel, and so on. These various types of information can be intermittent (e.g., pages for a given terminal) or continuous (e.g., broadcast to a terminal). The synchronization between the three base stations is denoted by the time relationship between the overhead channel frames for these base stations being approximately constant in time, except possibly for small fluctuations around a nominal value. In this configuration, the frame numbers for the overhead channel frames at any given time instance are the same for all three base stations.

Figure 4B:
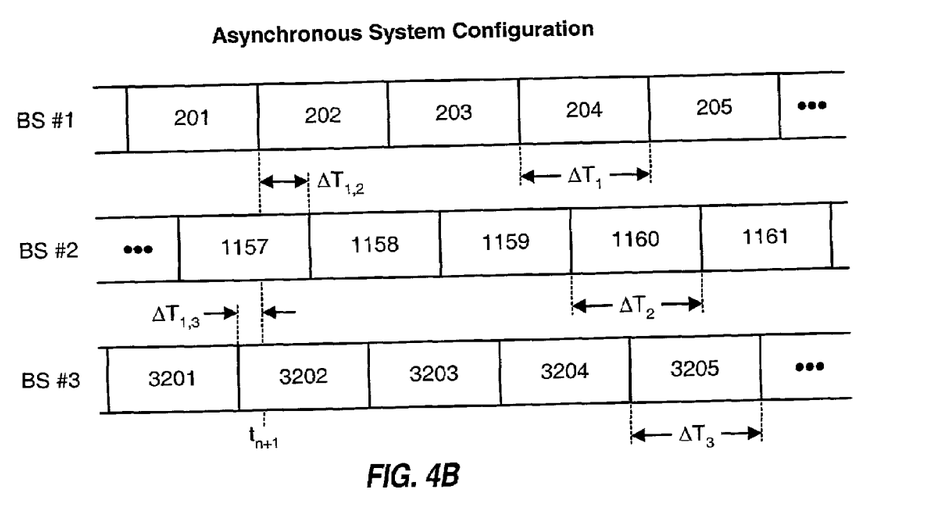

FIG. 4B is a diagram illustrating a system configuration in which three base stations are operated asynchronously. In this configuration, the base stations are not synchronized and the time relationship between the overhead channel frames for these base stations changes over time, for example, due to unequal amount of traffic or different transmission and queuing delay. The long-term average value of this drift may be zero or may be some non-zero value (i.e., the time difference between the base stations may continually increase or decrease). Because of the asynchronous operation, the overhead channels for these base stations are not likely to start at the same time (unless by coincidence). Moreover, the frame numbers for the overhead channel frames at any given time instance are not likely to be the same for all base stations.

A terminal in the system may concurrently receive multiple transmissions from multiple transmitter units. These transmitter units may be located within physically separated base stations in the system. Alternatively, these transmitter units may be co-located within the same base station, such as for a base station that services multiple sectors of a given cell. Each of the multiple transmissions received at the terminal may have been processed (e.g., coded and modulated) at a respective transmitter unit as described above in FIG. 2.

To increase reliability and improve the likelihood of correct reception, a terminal may receive similarly formatted messages from multiple transmitter units for the same underlying message. For example, multiple page messages having the same content and generated in similar manner may be transmitted from multiple transmitter units for the terminal.

When receiving transmissions from multiple transmitter units in a synchronous configuration (such as that shown in FIG. 4A) or an asynchronous configuration (such as that shown in FIG. 4B), the transmissions from multiple transmitter units may not be synchronized with respect to a given underlying message. Similarly formatted messages may be transmitted from multiple transmitter units at different times due to various factors such as, for example, (1) different reference times for asynchronous transmitter units, or (2) queuing delay, transmission delay, loading, and so on, for synchronous transmitter units. Thus, the similarly formatted messages from multiple transmitter units may be received by the terminal at different times, and the transmitter units and their transmissions are then considered to be non-synchronous with respect to these messages. If these messages are not time-aligned within a requisite time window at the terminal (e.g., within the maximum deskewing capability of the deskew buffer at the finger processors in the terminal's rake receiver), then the symbols for these messages cannot be combined in a straightforward manner prior to decoding. Other techniques would then be needed to process these messages, as described below.

The transmissions from the transmitter units may include common (e.g., broadcast) and/or dedicated (e.g., page) messages for the terminals in the system. The common messages may be received by all terminals in the system. Each dedicated message is directed toward a specific terminal or a specific group of terminals, as indicated by a recipient field in the message. Even though the dedicated messages may be received by all terminals in the system, only the specific terminal(s) addressed by each dedicated message would process the message. All other terminals would perform the initial processing to recognize that the message is not targeted for them and would then take no further action.

Each message may have a fixed or variable length, and may span one or multiple frames. To protect the integrity of each message, a CRC value may be appended at the message level before the message is broken into frames (e.g., a set of CRC bits may be generated from all bits in the message by CRC generator 212 in FIG. 2). Then, another CRC value may be appended at the frame level for each frame of the message (e.g., a set of CRC bits may be generated from all bits in each frame by CRC generator 216).

A given terminal may receive one or multiple transmissions from one or multiple transmitter units. The set of transmitter units may be identified to the terminal at an earlier stage (e.g., when the terminal receives its overhead messages). Thereafter, the terminal receives and processes the transmissions from these transmitter units to receive traffic data and/or messages. These transmitter units may be included in the terminal's active set or virtual active set.

In an embodiment, each terminal only receives messages sent at specific designated times or time intervals. For example, page messages are typically sent to the terminals based on a known schedule. The terminals in the system may be divided into a number of groups based on their unique identities, which may be the Electronic Serial Number (ESN), the Mobile Identification Number (MIN), the International Mobile Subscriber Identification number (IMSI), or some other identification that uniquely identifies the terminals. Each group of terminals would then receive page messages, if at all, at specific times (i.e., a schedule) designated for that group. The schedule for the transmission of messages to the terminals in each group may be fixed permanently or may be varied over time. Moreover, all transmitter units may follow the same schedule for each group of terminals, or each transmitter unit may define and use a separate schedule for each group of terminals.

In any case, each terminal is provided with the schedule to be used by each transmitter unit from which it may receive messages (i.e., the transmitter units in the terminal's active set). The same schedule may be used for all transmitter units in the active set or virtual active set, or each transmitter unit may use a different schedule to transmit messages to the terminal. The terminal knows a priori when a message may be sent to it by each transmitter unit.

As noted above, the messages may be of a particular fixed length or variable lengths. The terminal may be informed of the length of each message a priori, or may be able to determine the message length via a length field included in the message (which is typically included in the first frame of the message). Knowing the schedule(s) for possible messages and the length of each message, the terminal is then able to receive each transmitted message intended for it.

An idle terminal may "sleep" between designated times to conserve battery power, and would only need to wake up just before each designated time to process one or more transmissions from one or more transmitter units in the active set to determine whether or not a message has been sent to the terminal. If the terminal determines that a message has been sent to it (or may have been sent to it, if a quick paging indicator is transmitted on a quick paging channel), then the terminal processes the one or more transmissions received from the one or more transmitter units. Otherwise, if the terminal determines that no messages have been sent to it (e.g., via the absence of the quick paging indicator), then it can go back to sleep and thereafter wakes up prior to the next designated time to process the next message.

The terminal processes the received signal and assigns at least one finger processor to each transmission received from the transmitter units, if channel conditions and hardware and software limitations permit. Each finger processor processes a specific signal instance (or one multipath component) assigned to that finger processor and provides a stream of demodulated symbols. If multiple finger processors are assigned to process multiple signal instances from a particular transmitter unit, then the demodulated symbols from these finger processors may be aligned in time (via the deskew buffers) and combined to provide a single stream of recovered symbols for the transmission from that transmitter unit. Thus, multiple streams of recovered symbols may be provided by the demodulator for multiple transmissions received from multiple transmitter units, one stream for each received transmission. These recovered symbol streams may then be processed as described below to recover the transmitted messages.

Figure 5:
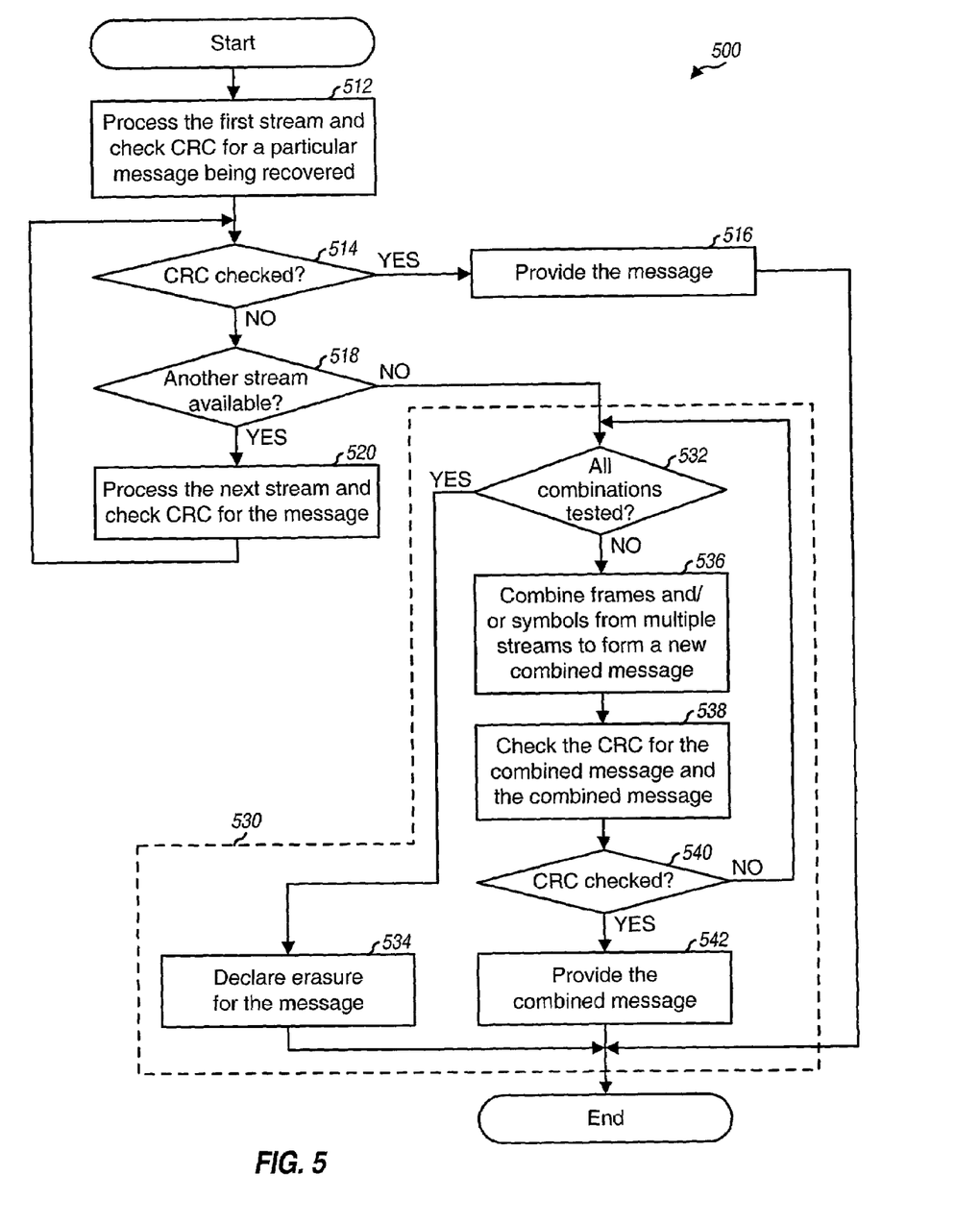
FIG. 5 is a flow diagram of an embodiment of a process to recover a message from multiple received transmissions.

FIG. 5 is a flow diagram of an embodiment of a process 500 to recover a particular desired (underlying) message that may be transmitted via multiple transmissions from multiple transmitter units. In this embodiment, the terminal first processes each recovered symbol stream separately to attempt to recover the desired message error-free. If the desired message cannot be recovered error-free from any single stream, then portions (e.g., frames and/or symbols) from multiple streams may be combined to attempt to recover the message.

In an embodiment, the recovered symbol streams are processed one at a time and in a particular order determined based on the signal quality of these streams. The signal quality of a given stream may be estimated in various manners, such as by the signal-to-noise-and-interference ratios (SNRs) of the stream, the pilot energy-per-chip-to-total-noise-ratio ($E_c/I_0$), and so on. The stream associated with the best signal quality may be processed first, the stream associated with the second best signal quality may be processed next, and so on.

Each stream is processed by deinterleaving and decoding the symbols for each frame of the message, checking the CRC value for each decoded frame, assembling the decoded frames to form the message, and checking the CRC value for the message, at step 512. Other quality metrics may also be derived and monitored for the current stream being processed. Such quality metrics may include, for example, the re-encoded symbol error rate (SER), the re-encoded power metric, the "modified" Yamamoto metric, and so on. These quality metrics are described in further detail in U.S. patent application Ser. No. 09/810,685, entitled "Method and Apparatus for Adjusting Power Control Setpoint in a Wireless Communication System," filed Mar. 15, 2001, assigned to the assignee of the present application and incorporated herein by reference.

A determination is then made whether or not the quality of the message recovered from the current stream being processed is sufficient (e.g., whether or not the CRC checks at both the frame and message levels), at step 514. If the message quality is sufficient, then the message recovered from the stream is processed (e.g., by the higher signaling layer), at step 516, and the process terminates.

Otherwise, if the quality of the recovered message is insufficient (e.g., if a CRC does not check at either the frame or message level), then a determination is next made whether or not another (not yet processed) stream is available for processing, at step 518. If another stream is available, then the next stream (e.g., the one with the next best signal quality) is processed and the quality of the message recovered from this stream is checked, at step 520. The process then returns to step 514 to determine whether or not the message quality for the current stream is sufficient. Again, if the message quality is sufficient, then the message recovered from the current stream is provided for further processing (by the higher signaling layer) at step 516.

The first loop formed by steps 514, 518, and 520 may be repeated for as many times as there are available streams and for as long as the recovered message has insufficient quality. The first recovered message having sufficient quality is provided for further processing, and any remaining streams may be ignored, or stored for possible combining for other messages.

Back at step 518, if all streams have been processed and none of the messages recovered from these streams have sufficient quality, then the process combines various portions (e.g., frames and/or symbols) of multiple streams to attempt to recover the message error-free, in block 530. Various schemes may be used to combine the multiple streams, some of which are described in further detail below. Block 530 is a specific embodiment for combining multiple streams to recover the message.

Initially, a determination is made whether or not all allowable combinations of multiple streams have been tested, at step 532. The number of different combinations to be tested to recover the message may be limited, and this number may be dependent on the specific scheme being implemented to combine multiple transmissions and possibly other factors. If all allowable combinations have been tested and the message still cannot be recovered error-free, then an erasure is declared for the message, at step 534, and the process terminates.

Otherwise, portions of multiple streams are combined in a particular manner determined by the combination scheme being implemented to form a new combined message, at step 536. Again, various schemes may be used for step 536, as described in further detail below. The quality of the combined message is then checked, at step 538. If the quality of the combined message is sufficient (e.g., if all the CRCs check at both the frame and message levels), as determined in step 540, then the combined message recovered from the multiple streams is provided for further processing, at step 542, and the process terminates. Otherwise, the process returns to step 532 to determine whether or not another combination of multiple streams may be tested. The second loop formed by steps 532 through 540 may be repeated for as many times as the number of allowable combinations and for as long as the combined message has insufficient quality.

In another embodiment to recover a particular desired message transmitted via multiple transmissions from multiple transmitter units, all recovered symbol streams are processed (e.g., in parallel or serially), and the message recovered from the stream having the best quality and exceeding a particular quality threshold is provided for further processing. Again, portions from multiple streams may be combined to attempt to recover the desired message error-free if it cannot be recovered from any single stream.

As noted above, various schemes may be used to combine portions of multiple recovered symbol streams for multiple received transmissions if the desired message cannot be recovered error-free from any single stream. The combinations of multiple streams may be performed at the frame level or at the symbol level, or both. Moreover, the combination may be performed in different manners depending on various factors such as (1) whether or not the transmitter units are operated non-synchronously, (2) whether or not the terminal has frame level timing of the transmitter units, and so on.

Figure 6:
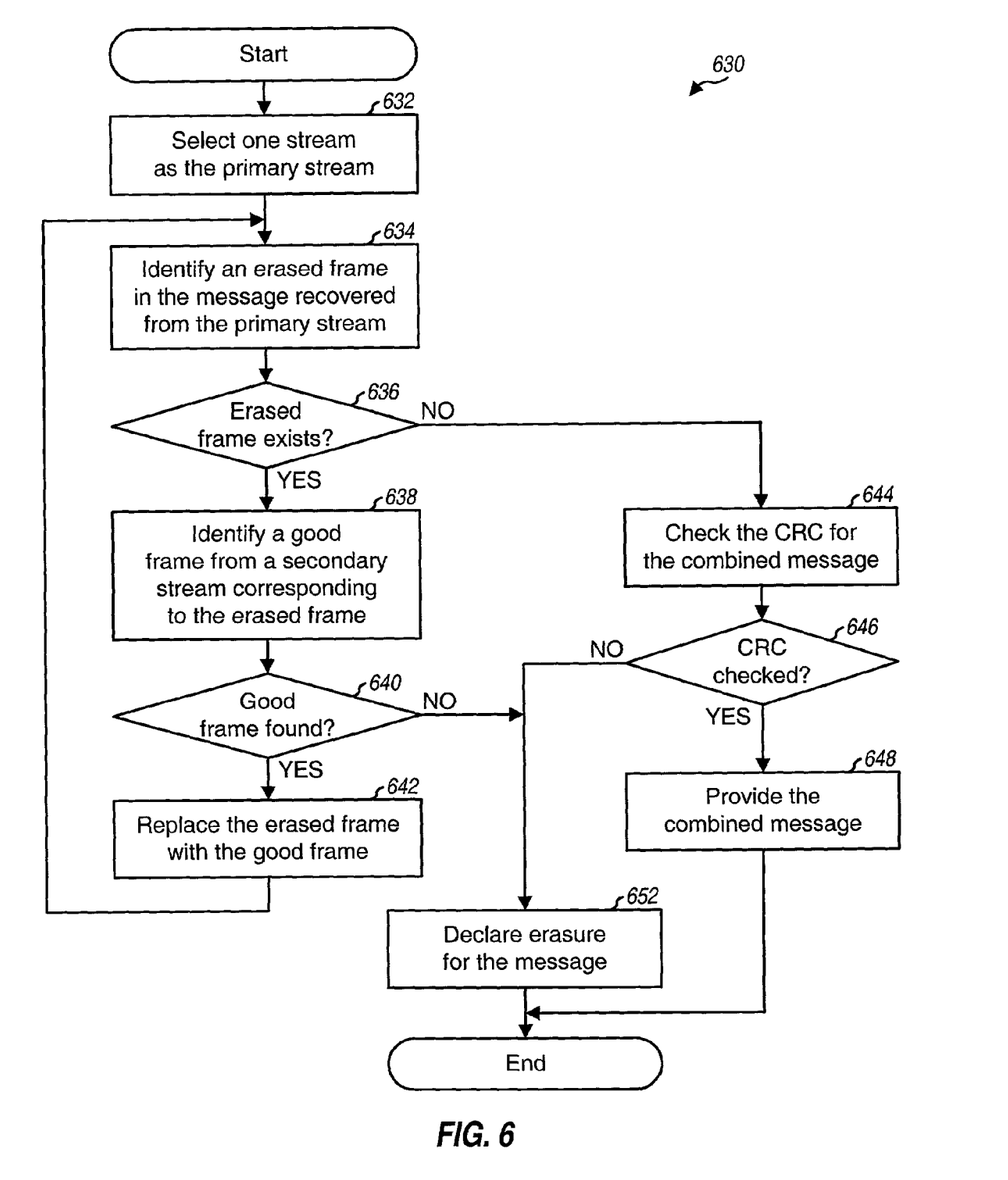
FIGS. 6 and 7 are flow diagrams of two embodiments of a process for combining frames from multiple received transmissions to recover a particular message.

FIG. 6 is a flow diagram of an embodiment of a process 630 for combining frames from multiple transmissions to recover a particular desired (or underlying) message. In this embodiment, the terminal is assumed to know the frame-level timing of each received transmission. This frame-level timing may be provided from the transmitter unit or recovered from the good frames from the transmission. Process 630 may be used for block 530 in FIG. 5.

Initially, one of the recovered symbol streams is selected as the primary stream and all other recovered symbol streams are considered as secondary streams, at step 632. The primary stream may be the one with the best signal quality or the one with the least number of erased frames. The primary stream may also be selected based on some other criterion.

An erased frame in the message recovered from the primary stream is then identified, at step 634. If an erased frame is present in the message, as determined at step 636, then a good frame from one of the secondary stream(s) and corresponding to the erased frame is identified, at step 638. Since the terminal has frame-level timing in this embodiment, it is able to match up the corresponding frames from multiple transmissions.

A determination is then made whether or not a good frame from any secondary stream was found for the erased frame, at step 640. If the good frame was found, then the erased frame is substituted (i.e., replaced) with the good frame, at step 642. The process then returns to step 634 to check whether or not there is another erased frame in the message. Otherwise, if no good frame was recovered from any secondary stream for the erased frame, then an erasure is declared for the message, at step 652, and the process terminates.

The loop formed by steps 634 through 642 is repeated for each erased frame in the message recovered from the primary stream unless terminated earlier if a good frame cannot be recovered from any secondary stream for an erased frame. If all erased frames in the message recovered from the primary stream have been replaced with good frames from the secondary streams, as determined in step 636, then the CRC for the combined message is checked, at step 644. If the CRC checks at the message level, as determined at step 646, then the combined message recovered from multiple streams is provided for further processing, at step 648, and the process terminates. Otherwise, if the CRC does not check at the message level, then an erasure is declared for the message, at step 652, and the process also terminates.

In the above embodiments, the CRC is relied on to determine whether or not a given frame has been received correctly or in error. In certain instances, a frame may pass the CRC check even though it is received in error. Thus, if multiple good frames are recovered from multiple secondary streams for a given erased frame in the message recovered from the primary stream, then these good frames may be compared against each other to determine whether or not they contain the same content. If the contents for these supposedly good frames are not the same, then each good frame with different content may substitute for the erased frame, and the CRC is then checked at the message level for each combination. The flow diagram in FIG. 6 may be modified accordingly to implement multiple substitutions of different good frames for a given erased frame.

Figure 7:
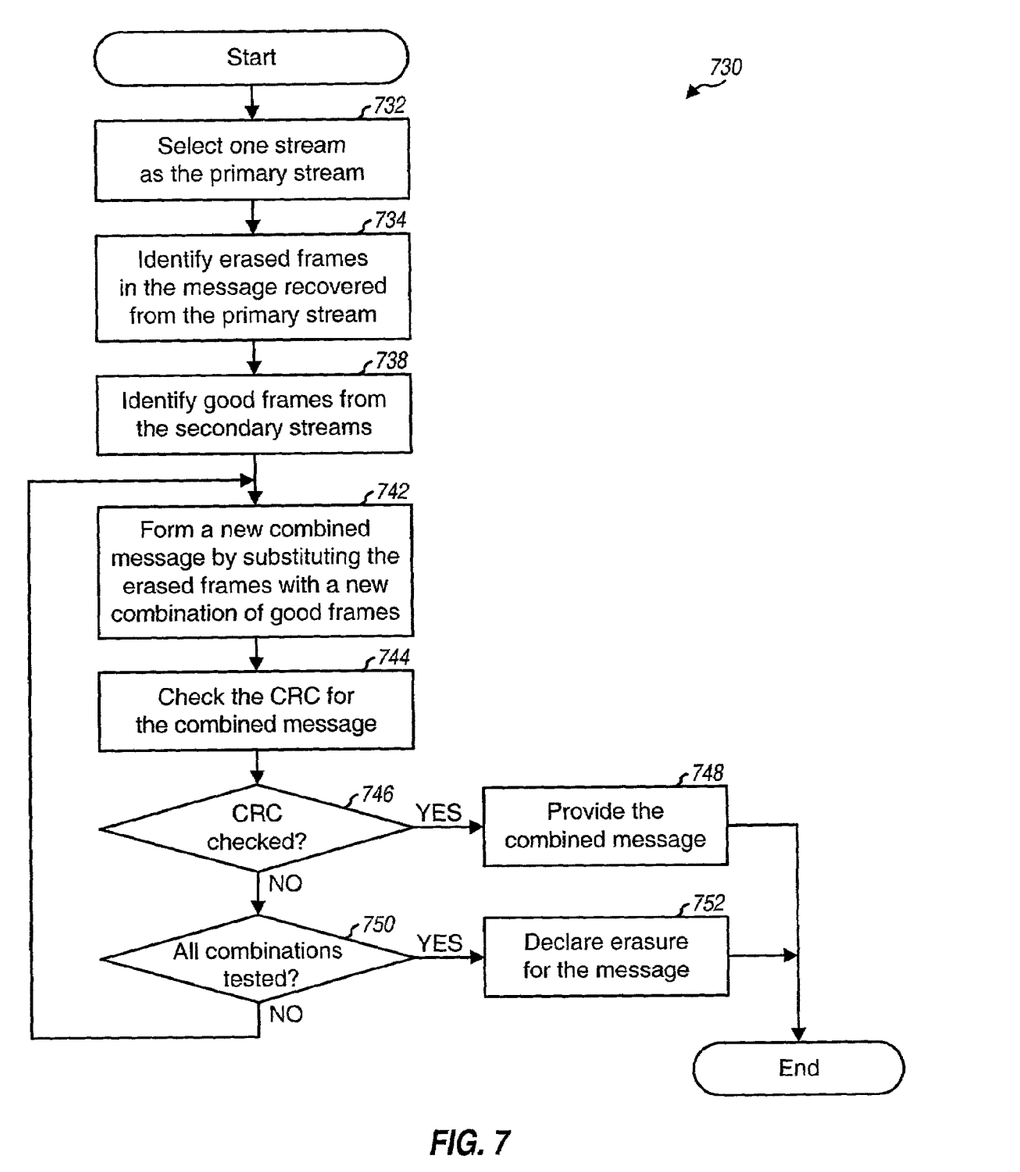

FIG. 7 is a flow diagram of another embodiment of a process 730 for combining frames from multiple transmissions to recover a particular desired message. In this embodiment, the terminal does not know the frame-level timing for the received transmissions. This may be the case if the transmitter units are operated non-synchronously. Process 730 may also be used for block 530 in FIG. 5.

Initially, one of the recovered symbol streams is selected as the primary stream and all other recovered symbol streams are considered as secondary streams, at step 732. All erased frames in the message recovered from the primary stream are then identified, at step 734. All good frames for the message and recovered from the secondary streams are also identified, at step 738.

At step 742, a new combined message is formed by substituting the erased frames with a set of good frames selected from among all good frames previously identified in step 738. If the terminal does not have frame-level timing, then it may not be able to determine which good frame corresponds to a given erased frame. In this case, the terminal can attempt to substitute the erased frames with various different combinations of good frames. For each combined message formed by substituting a different set (or combination) or good frames for the erased frames, the CRC for the combined message is checked, at step 744. If the CRC checks at the message level, as determined in step 746, then the combined message recovered from multiple streams is provided for further processing, at step 748, and the process terminates.

Otherwise, if the CRC does not check at the message level for this combined message, then a determination is made whether or not all allowable combinations have been tested, at step 750. If all combinations have not yet been tested, then the process returns to step 742 to form a new combined message for evaluation. Otherwise, if all combinations have been tested and the message-level CRC does not check for any combined message, then an erasure is declared for the message, at step 752, and the process also terminates.

Since the frame-level timing is not known a priori in the above embodiment, the message-level CRC is relied on to determine the proper alignment of the frames recovered from multiple transmissions. Various techniques may be used to limit the number of different combinations to test.

In one embodiment, a maximum time delay is determined by the base station and conveyed to the terminal. The terminal may then test all combinations of the signal streams within this maximum delay. In another embodiment, the maximum time delay is set by the terminal according to its processing and storage capabilities. In yet another embodiment, some frames may contain the message sequence number, the frame number within the message, or both. The terminal may then use this information to match up the correctly received frames from the parallel streams. In yet another embodiment, the terminal can perform a "projecting" operation (e.g., taking an inner product between the received frames, with the symbols as components in a vector) to determine a match between streams. In this embodiment, a vector may be formed by all or portions of the soft-decision symbols or hard-decision symbols from a frame or multiple frames that are from a given stream. This vector is then used as the input to an inner product (dot product) operation with another vector formed by symbols from another stream. The resultant value is a metric of the similarity or likeness between the two streams or their time offsets. The most likely (as defined by the inner product operation above) time offset between a pair of streams may be combined first for decoding and CRC checking. If this pairing fails, then the second most likely pairing may be combined and tested. This processing can continue until all possible pairings or all possible pairings with certain level of likeliness and higher are tested.

Referring back to FIG. 3, each decoded frame is checked by CRC checker 322 based on the frame-level CRC, and the frames that pass the CRC check may be provided to frame buffer 326. Frame buffer 326 may thus be used to store the good frames received for each message to be recovered by the receiver unit. The appropriate combinations of good frames (e.g., as determined by controller 330) may thereafter be retrieved and provided to frame assembler 324, which then assembles these frames to form a combined message. CRC checker 328 then checks the combined message based on the message-level CRC and provides a message status to controller 330. If the message status indicates that the combined message is erased, then controller 330 may direct frame buffer 326 to provide another set of good frames to frame assembler 324 to form another combined message. This process may be repeated until a combined message passes the message-level CRC or all allowable combinations have been tested.

In certain instances, a good frame may not have been recovered from any of the secondary streams for an erased frame in the message recovered from the primary stream. In this case, the erased frame cannot be replaced with another good frame derived from a single stream. Instead of declaring the message as being erased, various schemes may be used to attempt to derive a good frame for the erased frame using the symbols recovered from multiple transmissions. A specific symbol combining scheme is described in further detail below.

Figure 8:
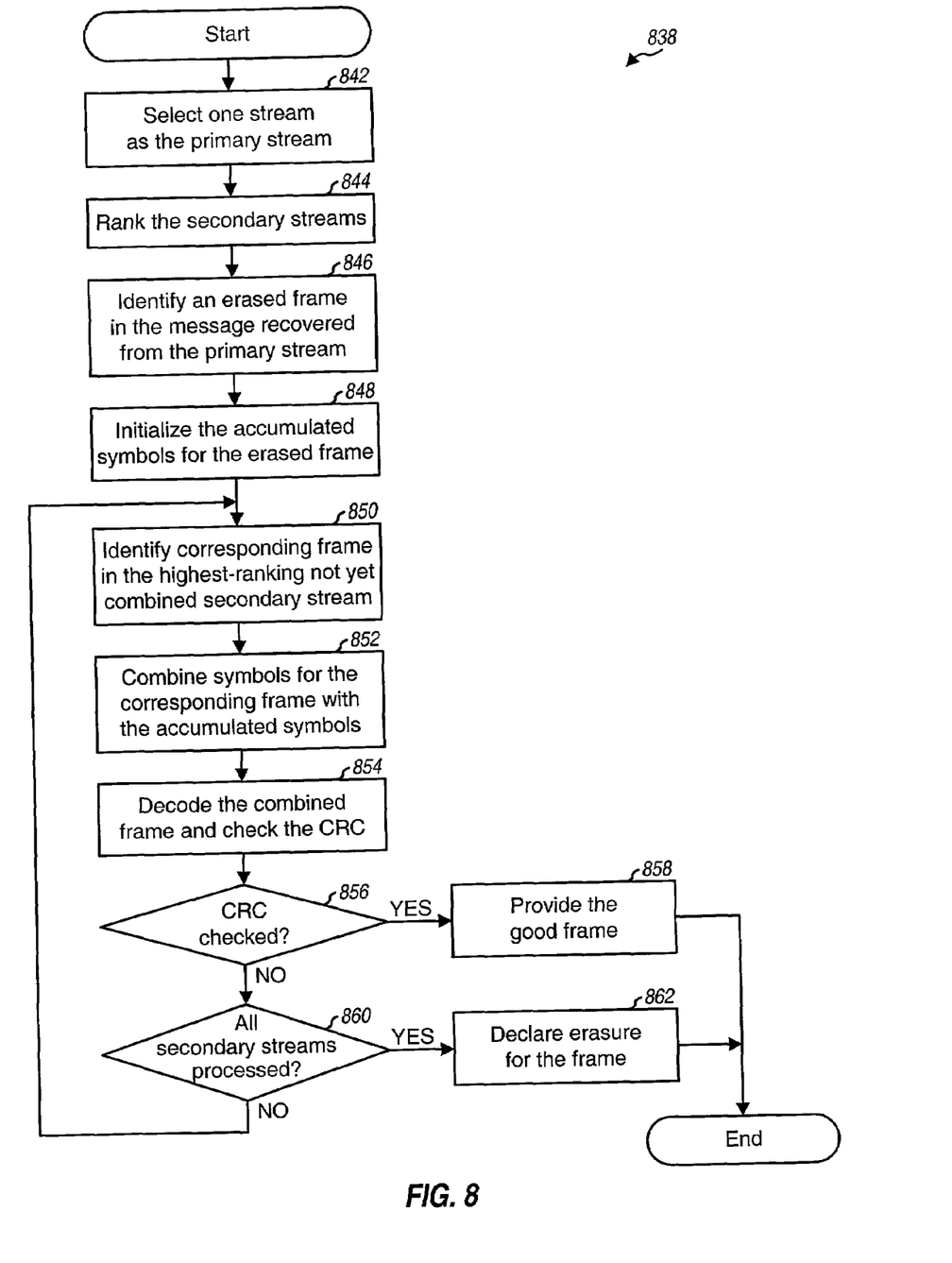
FIG. 8 is a flow diagram of an embodiment of a process for combining symbols from multiple received transmissions to recover a particular frame.

FIG. 8 is a flow diagram of an embodiment of a process 838 for combining symbols from multiple transmissions to attempt to recover a particular frame error-free. In this embodiment, the terminal is assumed to know the symbol-level timing for the received transmissions. Process 838 may be used within steps 638 and 738 in FIGS. 6 and 7, respectively, to provide a good frame for an erased frame.

Initially, one of the recovered symbol streams is selected as the primary stream, at step 842. All other recovered symbol streams are considered as secondary streams and are ranked in a particular order, at step 844. The ranking may be based on (1) the signal quality associated with these streams (e.g., the stream with the highest signal quality is ranked the highest), (2) the number of erased frames for the messages recovered from these streams (e.g., the stream with the fewest number of erased frames is ranked the highest), or some other criterion.

An erased frame in the message recovered from the primary stream, which is to be replaced with a good frame, is identified, at step 846. Next, the accumulated symbols used to derive the good frame for the erased frame may be initialized to a particular value (e.g., zero) or to the symbols from the erased frame, at step 848. The frame in the highest-ranking (but not yet combined) secondary stream corresponding to the erased frame is then identified, at step 850, and the symbols for this corresponding frame are combined with the accumulated symbols, at step 852.

The combined frame formed by the accumulation of symbols from multiple transmissions is then decoded and checked at the frame level, at step 854. If the CRC for this combined frame checks, as determined at step 856, then the combined frame is provided as the good frame for the erased frame, at step 858, and the process terminates.

Otherwise, if the CRC does not check for this combined frame, then a determination is made whether or not all secondary streams have been processed, at step 860. If all secondary streams have not yet been processed, then the process returns to step 850 to form a new combined frame using the symbols from the next highest-ranking secondary stream. Otherwise, if all secondary streams have been combined and the frame-level CRC does not check for any combined frame, then an erasure is declared for the frame, at step 862, and the process also terminates.

FIG. 8 shows an embodiment wherein symbols from different streams are combined in a particular order based on the ranking of the recovered symbol streams corresponding to the received transmissions. Due to multipath and other phenomena, it is possible that the quality of these transmissions may change over time. Thus, the ranking may be performed for each erased frame (e.g., based on the $E_c/I_0$ estimate for the pilot received at approximately the same time as the frame being combined or with as small a time difference as possible).

The symbols from different streams may also be combined in various manners. In one embodiment, the symbols from multiple streams for each symbol period are linearly combined to derive the accumulated symbol for that symbol period. In another embodiment, the symbol from each stream is weighted by the estimated quality of the symbol (e.g., by the pilot $E_c/I_0$ for the stream), and the weighted symbols from multiple streams are combined to derive the accumulated symbol. The weighting of the symbols by the estimated signal quality is automatically performed when doing coherent demodulation, which performs a vector multiply of the symbols recovered from a particular code channel with the recovered pilot to derive the demodulated symbols. The vector multiple weighs the symbols by the signal quality of the stream, as estimated by the recovered pilot.

Referring back to FIG. 3, each demodulated frame is provided to decoder 318, which deinterleaves and decodes the symbols in the demodulated frame to provide a corresponding decoded frame. For each erased frame in the message recovered from the primary stream, decoder 318 may provide to symbol buffer 320 the erased frame from the primary stream and the frames from the secondary streams corresponding to the erased frame. Symbol buffer 320 may thus be used to store frames of symbols that may be combined to derive a good frame for each erased frame.

The erased and corresponding frames may thereafter be retrieved from symbol buffer 320 and combined within decoder 318 as described above to derive combined frames for erased frames. Each combined frame is derived from a particular set of erased and/or corresponding frames, which may be determined by controller 330. Decoder 318 then decodes each combined frame to derive a decoded frame, which is then checked by CRC checker 322 based on the frame-level CRC. CRC checker 322 also provides a frame status to controller 330. If the frame status indicates that the combined frame is erased, then controller 330 may direct symbol buffer 320 to provide the symbols from another secondary stream to decoder 318, which then combines these symbols with the prior accumulated symbols to form another combined frame. This process may be repeated until a combined frame passes the frame-level CRC or all streams have been processed.

The techniques described herein to selectively combine multiple transmissions (e.g., at the frame and/or symbol level) to recover messages error-free may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the selective combining techniques may be implemented with modules (e.g., procedures, functions, and so on) that perform the functions described herein. The software codes may be stored in a memory unit (e.g., memory 332 in FIG. 3) and executed by a processor (e.g., controller 330). The memory unit may be implemented within the processor or external to the processor, in which case it can be communicatively coupled to the processor via various means as is known in the art.

And for a hardware/software implementation, some of the processing may be performed by hardware and some other processing may be performed by software. For example, in FIG. 3, the demodulation, decoding, frame-level CRC checking, symbol accumulation, and frame assembly may be performed in hardware, and the message-level CRC checking may be performed in software.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for selectively combining a plurality of received transmissions from a plurality of respective signal sources to recover a message comprised of a plurality of frames, comprising:
    processing each of the plurality of received transmissions from the plurality of respective signal sources separately to recover the message; and
    if the message cannot be recovered error-free from a single received transmission,
        determining erased frames in a message recovered from a first received transmission,
        determining good frames recovered from remaining ones of the plurality of received transmissions,
        forming at least one combined message, wherein each combined message includes a particular combination of good frames substituting for the erased frames, and checking each combined message to determine whether it is good or erased.

2. The method of claim 1, wherein the first received transmission is one having a highest signal quality among the plurality of transmissions.

3. The method of claim 1, further comprising:
    checking each frame in the message recovered from the first received transmission; and
    marking each frame failing the checking as an erased frame.

4. The method of claim 3, wherein each frame is checked based on a set of cyclic redundancy check (CRC) bits generated for the frame.

5. The method of claim 1, wherein each combined message is checked based on a set of cyclic redundancy check (CRC) bits generated for the message.

6. The method of claim 1, wherein a single combined message is formed by
    identifying each erased frame in the message recovered from the first received transmission,
    identifying a good frame, from one of the plurality of received transmissions, corresponding to each erased frame, and
    substituting each erased frame with the corresponding good frame to form the combined message.

7. The method of claim 1, wherein the good frame corresponding to each erased frame is identified based on a frame number associated with each frame.

8. The method of claim 1, wherein a plurality of combined messages are formed by
    identifying a plurality of combinations of good frames for the erased frames in the message recovered from the first received transmission, and
    substituting each combination of good frames for the erased frames to form a respective combined message.

9. The method of claim 1, further comprising:
    if the message cannot be recovered error-free from a single received transmission and a good frame corresponding to a particular erased frame cannot be derived from a single received transmission,
        combining symbols for two or more frames, from two or more received transmissions, corresponding to the erased frame, and
        decoding the combined symbols to derive a good frame for the erased frame.

10. The method of claim 9, further comprising:
    if the message cannot he recovered error-free from a single received transmission and a good frame corresponding to a particular erased frame cannot be derived from a single received transmission,
        ranking the plurality of received transmissions, and wherein symbols for frames corresponding to the erased frames are combined in a particular order determined based on the ranking of the plurality of received transmissions.

11. The method of claim 10, wherein the plurality of received transmissions are ranked based on their signal quality.

12. The method of claim 9, further comprising:
    if the message cannot be recovered error-free from a single received transmission and a good frame corresponding to a particular erased frame cannot be derived from a single received transmission, weighting symbols for each of the two or more frames corresponding to the erased frame based on a respective weight determined based on the signal quality of the two or more transmissions from which the two or more frames are recovered, and wherein the weighted symbols are combined.

13. The method of claim 1, wherein each received transmission is a forward link signal from a respective base station in a CDMA system.

14. The method of claim 1, wherein the plurality of received transmissions are approximately synchronous.

15. The method of claim 1, wherein the plurality of received transmissions are synchronous.

16. The method of claim 1, wherein the message to be recovered error-free is a page message.

17. A method for selectively combining a plurality of non-synchronous forward link received transmissions from a plurality of respective signal sources to recover a page message comprised of a plurality of frames, comprising:
processing each of the plurality of non-synchronous forward link received transmissions from the plurality of respective signal sources separately to recover the page message; and
if the page message cannot be recovered error-free from a single received transmission,
determining erased frames in a message recovered from a first non-synchronous forward link received transmission, based on a set of cyclic redundancy check (CRC) bits included with each frame,
determining a good frame, recovered from one of the plurality of non-synchronous forward link received transmissions, for each erased frame,
forming a combined message by substituting each erased frame with a corresponding good frame, and
checking the combined message based on a set of CRC bits included with the message to determine whether it is good or erased.

18. A receiver unit in comprising:
a demodulator operative to receive and process a plurality of signal instances from a plurality of respective signal sources in a received signal to provide a plurality of symbol streams, each symbol stream corresponding to a respective received transmission from one of a plurality of respective signal sources included in the respective signal;
a decoder operative to process each of the plurality of symbol streams separately to recover a respective message comprised of a plurality of frames;
a first detector operative to detect each frame in each recovered message as either a good frame or an erased frame;
a second detector operative to detect each recovered message as either a good message or an erased message; and
a frame assembler operative to form at least one combined message, if a message cannot be recovered error-free from a single symbol stream, wherein each combined message includes a particular combination of good frames substituting for erased frames in the message recovered from a first symbol stream, and
wherein the second detector is further operative to detect each combined message as either a good message or an erased message.

19. The receiver unit of claim 18, further comprising:
a frame buffer operative to store good frames recovered from the plurality of symbol streams.

20. The receiver unit of claim 18, wherein the decoder is further operative to combine symbols for two or more frames, from two or more symbol streams, corresponding to an erased frame, and to decode the combined symbols to derive a good frame for the erased frame.

21. The receiver unit of claim 20, further comorising:
a symbol buffer operative to store symbols corresponding to each erased frame in the message recovered from the first symbol stream.

22. The receiver unit of claim 18, wherein the first and second detectors are cyclic redundancy check (CRC) checkers.

23. The receiver unit of claim 18, wherein the message to be recovered error-free is a page message.

24. A terminal in a CDMA system comprising the receiver unit of claim 18.

25. A digital signal processor, comprising:
means for processing a plurality of signal instances from a plurality of respective signal sources in a received signal to provide a plurality of symbol streams, wherein each symbol stream corresponds to a respective received transmission from one of a plurality of respective signal sources included in the received signal;
means for decoding each of the plurality of symbol streams separately to recover a respective message comprised of a plurality of frames;
means for detecting each frame in each recovered message as either a good frame or an erased frame;
means for detecting each recovered message as either a good message or an erased message; and
means for forming at least one combined message, if a message cannot be recovered error-free from a single symbol stream, wherein each combined message includes a particular combination of good frames substituting for erased frames in the message recovered from a first symbol stream, and wherein each combined message is detected to determine if it is a good message.

26. A receiver apparatus, comprising:
means for processing a plurality of signal instances in a received signal to provide a plurality of symbol streams from a plurality of respective signal sources, wherein each symbol stream corresponds to a respective received transmission from one of a plurality of respective signal sources included in the received signal;
means for decoding each of the plurality of symbol streams separately to recover a respective message comprised of a plurality of frames;
means for detecting each frame in each recovered message as either a good frame or an erased frame;
means for detecting each recovered message as either a good message or an erased message; and
means for forming at least one combined message, if a message cannot be recovered error-free from a single symbol stream, wherein each combined message includes a particular combination of good frames substituting for erased frames in the message recovered from a first symbol stream, and wherein each combined message is detected to determine if it is a good message.

* * * * *

UNITED STATES PATENT AND TRADEMARK OFFICE
CERTIFICATE OF CORRECTION

| | | |
|---|---|---|
| PATENT NO. | : 7,630,691 B2 | Page 1 of 1 |
| APPLICATION NO. | : 10/056278 | |
| DATED | : December 8, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Twenty-first Day of December, 2010

David J. Kappos
*Director of the United States Patent and Trademark Office*